(No Model.)

P. BROWNLEY.
ROLLER BUSH.

No. 264,619. Patented Sept. 19, 1882.

WITNESSES:
Chas. Nidg.
C. Sedgwick

INVENTOR:
P. Brownley
BY Munn &Co
ATTORNEYS.

UNITED STATES PATENT OFFICE.

PATRICK BROWNLEY, OF ST. JOHN, NEW BRUNSWICK, CANADA, ASSIGNOR TO HIMSELF AND ROBERT W. LOWE, OF SAME PLACE.

ROLLER-BUSH.

SPECIFICATION forming part of Letters Patent No. 264,619, dated September 19, 1882.

Application filed July 25, 1882. (No model.)

*To all whom it may concern:*

Be it known that I, PATRICK BROWNLEY, of St. John, in the county of St. John, Province of New Brunswick, and Dominion of Canada, have invented a new and Improved Roller-Bush, of which the following is a full, clear, and exact description.

The object of my invention is to materially reduce the friction of the surfaces which move in contact in rollers, pulleys, &c.

The invention consists in a roller-bush formed of a cup-shaped casing containing a series of anti-friction rollers, which are held in the casing by a screw-ring screwed into a threaded opening in the cup-shaped casing, which ring is held from unscrewing by tap-screws passed into the outer edge of the ring and the inner edge of the casing. The axle pintle or pivot is passed through the circular space between the rollers, against which rollers it rests.

Reference is to be had to the accompanying drawings, forming part of this specification, in which similar letters of reference indicate corresponding parts in all the figures.

Figure 1:
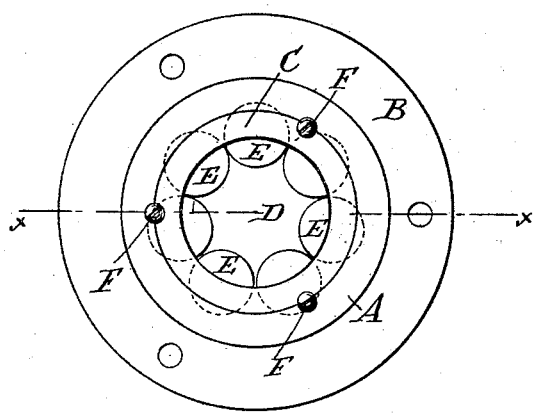
Figure 2:
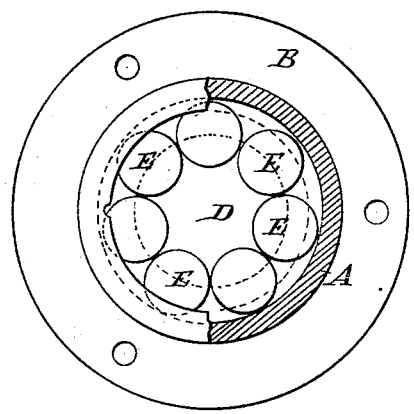
Figure 3:
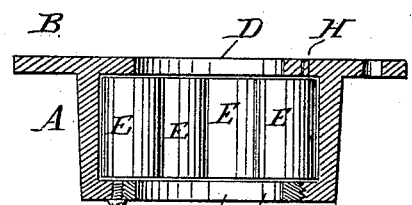
Figure 5:
Figure 6:
Figure 4:
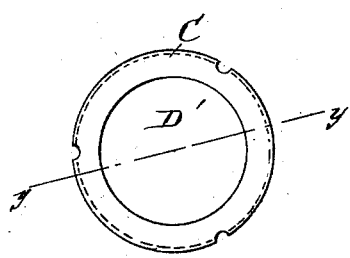

Figure 1 is a plan view of my improved roller-bush. Fig. 2 is a similar plan view, parts being broken out and shown in section. Fig. 3 is a cross-sectional elevation of the same on the line $x$ $x$, Fig. 1. Fig. 4 is a plan view of the locking-ring; Fig. 5, a side elevation of the same. Fig. 6 is a cross-sectional elevation of the same on the line $y$ $y$, Fig. 1.

A cup-shaped or cylindrical casing, A, is provided at one end with an annular flange, B, and at the opposite end with a large aperture which can be decreased in size by screwing a threaded ring, C, into it. That end of the casing A provided with the flange B is provided with an aperture, D, of the same size as the central aperture, D', of the ring C. A series of short cylindrical rollers, E, are placed in the casing A in such a manner that they rest along the periphery and will be parallel with the central longitudinal axis of the casing A, and can rotate on their longitudinal axis. According to the diameter of these rollers, a greater or less number will be required in the casing; but in all cases there must be so many rollers in the casing that the sides of the adjoining rollers touch each other, and thus lock each other in the casing—that is to say, if all the rollers are in place in the casing none can drop out, as each serves as a key for the others, and the rollers can only be removed by removing one laterally from the casing after having removed the locking-ring C. Then all the rest of the rollers will drop out. After all the rollers have been replaced in the casing the locking-ring C is screwed into the casing, and to prevent accidental unscrewing of the same one or more tap-screws, F, are screwed into the edges of the ring C and of the threaded opening of the casing A. No pivots or bearings are required for the rollers. The casing A is provided with an aperture, H, through which sand and dust can pass out of the interior of the casing A, or through which aperture oil can be poured into the casing. The pintle of a pulley or roller is passed through the apertures D D', and the above-described bushing can be attached to the pulley or to the sheaves, as may be desired. The parts can be made of iron, brass, steel, or any other suitable metal.

I am well aware that roller-bushes and anti-friction bearings have been made heretofore with anti-friction rollers arranged in a circle; but each roller had to be pivoted separately, and after short use these pivots broke and the bearing became worthless. My bushing is very strong and durable, and will not break.

Having thus described my invention, I claim as new and desire to secure by Letters Patent—

The end-open bush A, having an inner flange around each opening, provided on the inside of one opening with a screw-ring, C, and fitted with rolls E, as shown and described.

PATRICK BROWNLEY.

Witnesses:
JOSEPH G. MATHEWS,
JOHN KERR.